US011212660B2

(12) United States Patent
Taft et al.

(10) Patent No.: US 11,212,660 B2
(45) Date of Patent: Dec. 28, 2021

(54) MME INTERFACE FOR EN-DC NODE SELECTION

(71) Applicant: Verizon Patent and Licensing Inc., Arlington, VA (US)

(72) Inventors: David Taft, Keller, TX (US); Maqbool Chauhan, Keller, TX (US); Imtiyaz Shaikh, Irving, TX (US); Jerry Steben, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 153 days.

(21) Appl. No.: 16/676,039

(22) Filed: Nov. 6, 2019

(65) Prior Publication Data

US 2021/0136558 A1  May 6, 2021

(51) Int. Cl.
*H04W 8/08* (2009.01)
*H04W 8/20* (2009.01)
*H04W 88/16* (2009.01)
*H04W 8/26* (2009.01)
*H04W 8/04* (2009.01)
*H04W 60/04* (2009.01)
*H04W 36/00* (2009.01)
*H04B 7/0413* (2017.01)

(52) U.S. Cl.
CPC ............ *H04W 8/08* (2013.01); *H04W 8/04* (2013.01); *H04W 8/20* (2013.01); *H04W 8/26* (2013.01); *H04W 36/0033* (2013.01); *H04W 60/04* (2013.01); *H04W 88/16* (2013.01); *H04B 7/0413* (2013.01)

(58) Field of Classification Search
CPC ......... H04W 8/08; H04W 8/20; H04W 88/16; H04W 8/26; H04W 8/04; H04W 60/04; H04W 36/0033; H04W 36/00; H04W 36/0005; H04W 36/0007; H04W 36/0009; H04W 36/0016; H04W 36/03; H04B 7/0413; H04B 7/18541; H04L 47/767
See application file for complete search history.

(56) References Cited

U.S. PATENT DOCUMENTS

2020/0153875 A1* 5/2020 Karampatsis ....... H04L 65/1073

OTHER PUBLICATIONS

Trivisonno, Riccardo, Xueli An, and Qing Wei. "Network slicing for 5g systems: A review from an architecture and standardization perspective." 2017 IEEE Conference on Standards for Communications and Networking (CSCN). IEEE, 2017. (Year: 2017).*

* cited by examiner

*Primary Examiner* — Sharad Rampuria

(57) ABSTRACT

A computer device may include a memory storing instructions and processor configured to execute the instructions to receive a request for a connection to a Packet Data Network gateway (PGW) from a User Equipment (UE) device; obtain subscription type information for the UE device; and determine that the UE device is associated with a Fifth Generation (5G) subscription based on the obtained subscription type information. The processor may be further configured to obtain a list of available PGWs from a 5G Network Repository Function (NRF), in response to determining that the UE device is associated with the 5G subscription; select a PGW from the obtained list of available PGWs based on a selection rule; and send a create session request for the UE device to the selected PGW.

20 Claims, 7 Drawing Sheets

MME INTERFACE FOR EN-DC NODE SELECTION

BACKGROUND INFORMATION

In order to satisfy the needs and demands of users of mobile communication devices, providers of wireless communication services continue to improve and expand available services as well as networks used to deliver such services. One aspect of such improvements includes the development of core networks as well as options to utilize such core networks. A core network may manage a large number of devices experiencing different conditions. Managing all the different devices associated with different conditions poses various challenges.

DETAILED DESCRIPTION OF PREFERRED EMBODIMENTS

Figure 1:
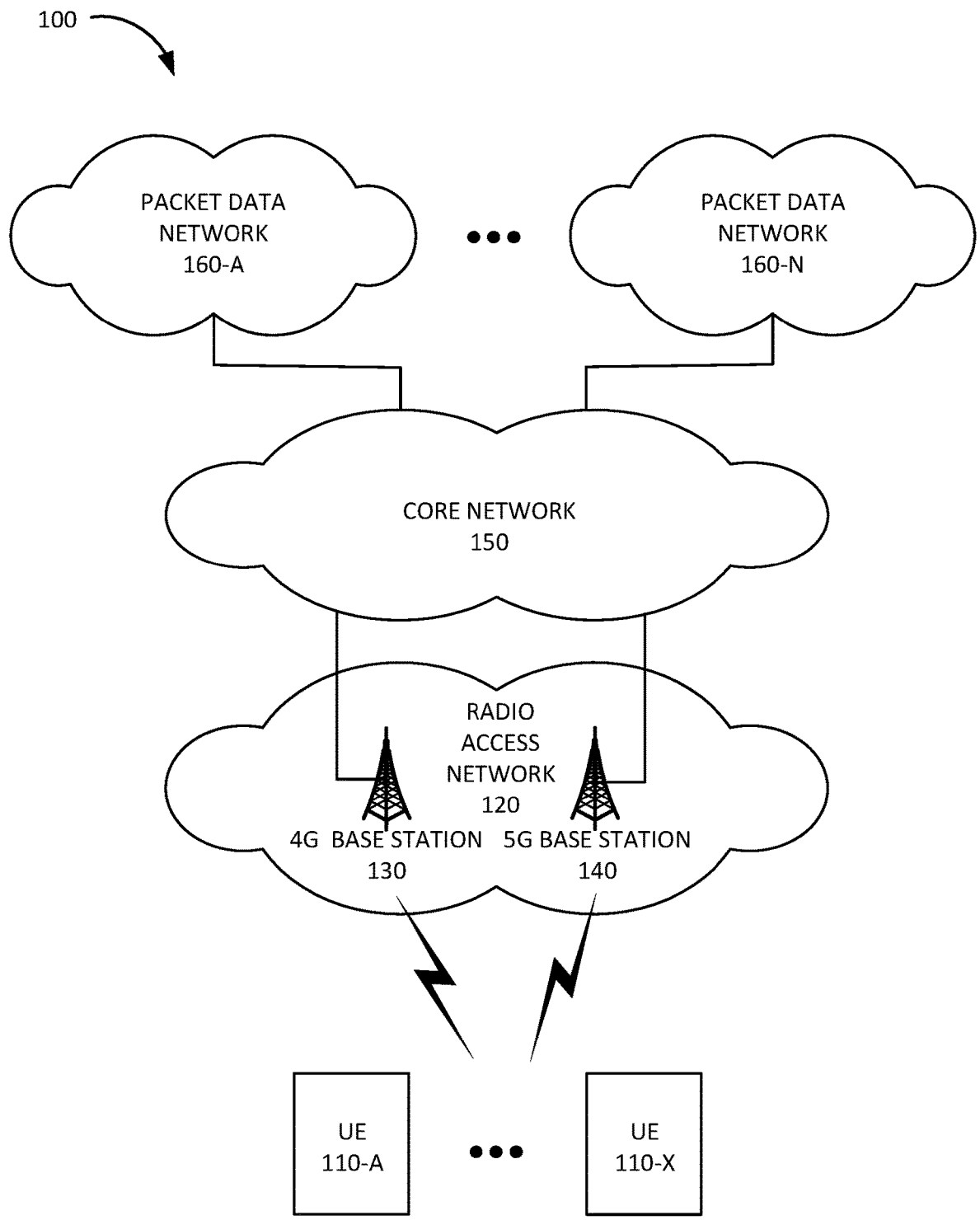
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless networks are continuing to become more complicated is by incorporating various aspects of next generation networks, such as $5^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

The 5G NR RAT mm-wave air interface may include a high bandwidth that provides high data throughput in comparison to the data throughput of a Fourth Generation (4G) Long Term Evolution (LTE) air interface, also referred to as the Evolved Universal Mobile Telecommunications System (UMTS) Terrestrial Radio Access (E-UTRA) air interface. However, because of the high mm-wave frequencies, the 5G NR RAT air interface may be susceptible to intermittent signal quality degradation due to multipath wave propagation and fading as a result of scattering from terrain objects, such as buildings, foliage, mountains, vehicles, etc.; reflection from bodies of water; ionospheric reflection and/or refraction; atmospheric attenuation and scattering; and/or other types of signal interference. Such variations in signal quality may be particularly important in areas with a low density of 5G coverage, such as during initial deployment of 5G base stations.

5G NR coverage may initially be sparsely deployed relative to existing air interface coverage. Thus, areas with 5G NR RAT coverage may also provide existing 4G RAT coverage and UE devices enabled to communicate using 5G NR may be able to attach to both a 4G base station, referred to as an eNodeB, and a 5G base station. A UE device may be simultaneously attached to a master cell group (MCG), also known as a master eNodeB, and a secondary cell group (SCG), also known as a secondary eNodeB. If 5G NR RAT coverage is available, the SCG may correspond to a 5G NR RAT base station, referred to as a gNodeB. Dual coverage using 4G and 5G networks may be referred as interoperability Option 3x.

Option 3x may also be referred to as E-UTRA NR Dual Connectivity (EN-DC). EN-DC may include a split bearer option in which a gNodeB splits user plane traffic when the 5G NR RAT air interface is not available (e.g., signal quality of the 5G NR air interface is below a signal quality threshold, the capacity of the 5G NR RAT air interface is below a capacity threshold, etc.). Thus, when the 5G NR RAT link is available, downlink data may be sent to the UE device via the gNodeB. When the 5G NR RAT link is not available, downlink data may be sent by the 5G base station to the eNodeB and the eNodeB may send the downlink data to the UE device via the 4G E-UTRA RAT air interface. Therefore, gNodeB may switch back and forth between sending the data via the 5G RAT air interface and the 4G RAT air interface.

Another aspect of improving the performance of wireless access networks is the use of virtualized network functions (VNFs) rather than dedicated hardware to implement particular function nodes. VNF representations of network devices and/or nodes may be implemented using, for example, a European Telecommunications Standards Institute (ETSI) network function virtualization (NFV) management and organization (MANO) architecture and may be referred to as VNF managed objects (VNF MOs). VNF MOs may be deployed, for example, on hardware in a cloud computing center. In contrast to specialized hardware, which may be costly, time-consuming to deploy, difficult to scale, and/or labor-intensive to manage, NFV may enable network entities to be implemented on standardized hardware, resulting in lower deployment and/or maintenance costs, as well as bring higher flexibility compared to dedicated hardware implementations. For example, a VNF may be implemented on a hardware component that is part of a common shared physical infrastructure used to implement VNF instances using Software Defined Networking (SDN) or another type of virtualization technique. The common shared physical infrastructure may be implemented using one or more computer devices in a cloud computing center, a mobile edge computing (MEC) system associated with a base station, and/or in another type of computer system.

However, the use of a VNF may not always be desirable. For example, a Packet Data Network gateway (PGW) may function as a gateway device from a core network of a provider of wireless communication services to a packet data network, such as a private network, the Internet, etc. A virtual PGW, that is, a PGW implemented as a VNF MO, may not be able to handle the same data throughput as a physical, or non-virtual, PGW implemented using dedicated hardware. An ability to handle high data throughputs may be particularly important for 5G connections handled by a gNodeB.

Implementations described herein relate to a node selection for EN-DC connections. A node, such as a PGW, may be selected for an EN-DC connection based on a selection rule that is based on subscriber type information for a UE device associated with the EN-DC connection. For example, if the UE device is identified as being associated with a 5G subscription, a non-virtual PGW may be selected for the connection so that the PGW is able to handle the high throughput associated with a 5G connection.

However, in a 4G core network, which may implement EN-DC, PGW selection may be performed using a Domain Name System (DNS) lookup. For example, the UE device may request an Access Point Name (APN) and a Mobility Management Entity (MME), which selects a PGW for a UE device, may request an Internet Protocol (IP) address for a PGW associated with the requested APN from a DNS server. The DNS server may not maintain any information relating to PGWs, such as whether a particular PGW corresponds to a virtual PGW, and may not be provide such PGW type information to the MME. Therefore, the MME may not be able to select an appropriate PGW for a requested connection.

Implementations described herein further relate to an MME interface to obtain a list of available PGWs from a Network Repository Function (NRF). An NRF may correspond to a 5G network function node (NF) that provides NF registration, management, discovery, and/or authentication services within a 5G core network. For example, when a new NF, such as, for example, an Access and Mobility Management Function (AMF) is brought online, the AMF may register its reachability and services information with the NRF so that other NFs in the 5G core network are able to communicate with the AMF. When another network component, such as, for example, a gNodeB base station, needs to communicate with an AMF, the gNodeB may send a request to the NRF to obtain the identity of an available AMF and the NRF may provide the reachability and other information relating to the AMF to the requesting gNodeB.

MME in a 4G core network with EN-DC functionality may be configured to interface with an NRF, even if a 5G core network is not available in the service area. The NRF may maintain a database of network nodes, such as PGWs, and may maintain information relating to the PGWs in the database. An NRF may communicate with other network nodes using a standardized Nnrf interface. The MME may implement a service-based interface (SBI) on top of the Nnrf interface. The MME may request a list of available PGWs from the NRF via the SBI and may implement a selection rule to select a particular PGW from the obtained list of available PGWs.

Furthermore, a UE device may not accurately report the type of subscription with which the UE device is associated. For example, a modem chip inside a UE device may store a field that indicates whether the UE device is associate with a 5G subscription and the field may become corrupted when the modem chip is subjected to high thermal loads. Therefore, implementations described herein further relate to discarding subscription type information received from the UE device and obtaining correct subscription type information from a Home Subscriber Server (HSS) that stores subscription records for UE devices.

Thus, a device, configured to function as an MME, may be configured to receive a request for a connection to a PGW from a UE device, obtain subscription type information for the UE device, and determine that the UE device is associated with a 5G subscription based on the obtained subscription type information. The device may be further configured to obtain a list of available PGWs from a 5G NRF, in response to determining that the UE device is associated with the 5G subscription, select a PGW from the obtained list of available PGWs based on a selection rule, and send a create session request for the UE device to the selected PGW.

If the subscription type information for the UE device indicates that the UE device is not associated with a 5G subscription, the device may use a 4G PGW selection process in response. For example, the device may send a request to a DNS server for an IP address associated with an APN included in the received request for the connection to a PGW.

Obtaining the subscription type information for the UE device may include discarding potentially incorrect subscription type information received from the UE device and obtaining correct subscription type information for the UE device from an HSS. Obtaining the list of available PGWs from the 5G NRF may include using an MME SBI to send the request for the list of available PGWs to the 5G NRF. The MME SBI may use an Nnrf interface to send the request for the list of available PGWs to the 5G NRF.

In some implementations, selecting the PGW from the obtained list of available PGWs based on the selection rule may include selecting a non-virtual PGW from the obtained list of available PGWs. Selecting a non-virtual PGW from the obtained list of available PGWs may include obtaining information indicating whether a particular PGW in the obtained list of available PGWs corresponds to a non-virtual PGW, from information included in the list of available PGWs obtained from the NRF. In other implementations, selecting the PGW from the obtained list of available PGWs based on the selection rule may include selecting a PGW from the obtained list of available PGW based on a location associated with the UE device.

FIG. 1 is a diagram of an exemplary environment 100 in which the systems and/or methods, described herein, may be implemented. As shown in FIG. 1, environment 100 may include UE devices 110A-110-X (referred to herein individually as "UE device 110" and collectively as "UE devices 110"), a radio access network 120, a core network 150, and packet data networks 160-A to 160-N (referred to herein collectively as "packet data networks 160" and individually as "packet data network 160").

UE device 110 may include any device with wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Furthermore, radio access network 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Radio access network 120 may include a 4G base station 130 and a 5G base station 140. 4G base station 130 and 5G base station 140 may each include devices and/or components configured to enable wireless communication with UE devices 110 located in cells or sectors serviced by a base station. For example, for each cell or sector serviced by the base station, the base station may include a radio frequency (RF) transceiver facing a particular direction. 4G base station 130 may be configured to communicate with UE devices 110 as an eNodeB that uses a 4G LTE air interface. 5G base station 140 may be configured to communicate with UE devices 110 as a gNodeB that uses a 5G NR air interface. For example, 5G base station 140 may include one or more antenna arrays configured to send and receive wireless signals in the mm-wave frequency range. 4G base station 130 and 5G base station 140 may communicate with each other to implement EN-DC for UE devices 110 that are associated with a 5G subscription. Furthermore, in some implementations, 4G base station 130 and/or 5G base station 140 may include, or be coupled to, a mobile edge computing (MEC) system that perform cloud computing and/or network processing services for UE devices 110.

Core network 150 may manage communication sessions for UE devices 110. For example, core network 150 may establish an IP connection between UE device 110 and a packet data network 160. Furthermore, core network 150 may enable UE device 110 to communicate with an application server, and/or another type of device, located in a packet data network 160 using a communication method that does not require the establishment of an IP connection between UE device 110 and packet data network 160, such as, for example, Data over Non-Access Stratum (DoNAS).

In some implementations, core network 150 may include an LTE access network (e.g., an evolved packet core (EPC) network). In other implementations, core network 130 may include a Code Division Multiple Access (CDMA) access network. For example, the CDMA access network may include a CDMA enhanced High Rate Packet Data (eHRPD) network (which may provide access to an LTE access network).

Packet data networks 160-A to 160-N may each include a packet data network. A particular packet data network 160 may be associated with an APN and UE device 110 may request a connection to the particular packet data network 160 using the APN. Packet data network 160 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular packet data network 160 may be managed by a communication services provider that also manages core network 150, radio access network 120, and/or particular UE devices 110. For example, in some implementations, a particular packet data network 160 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
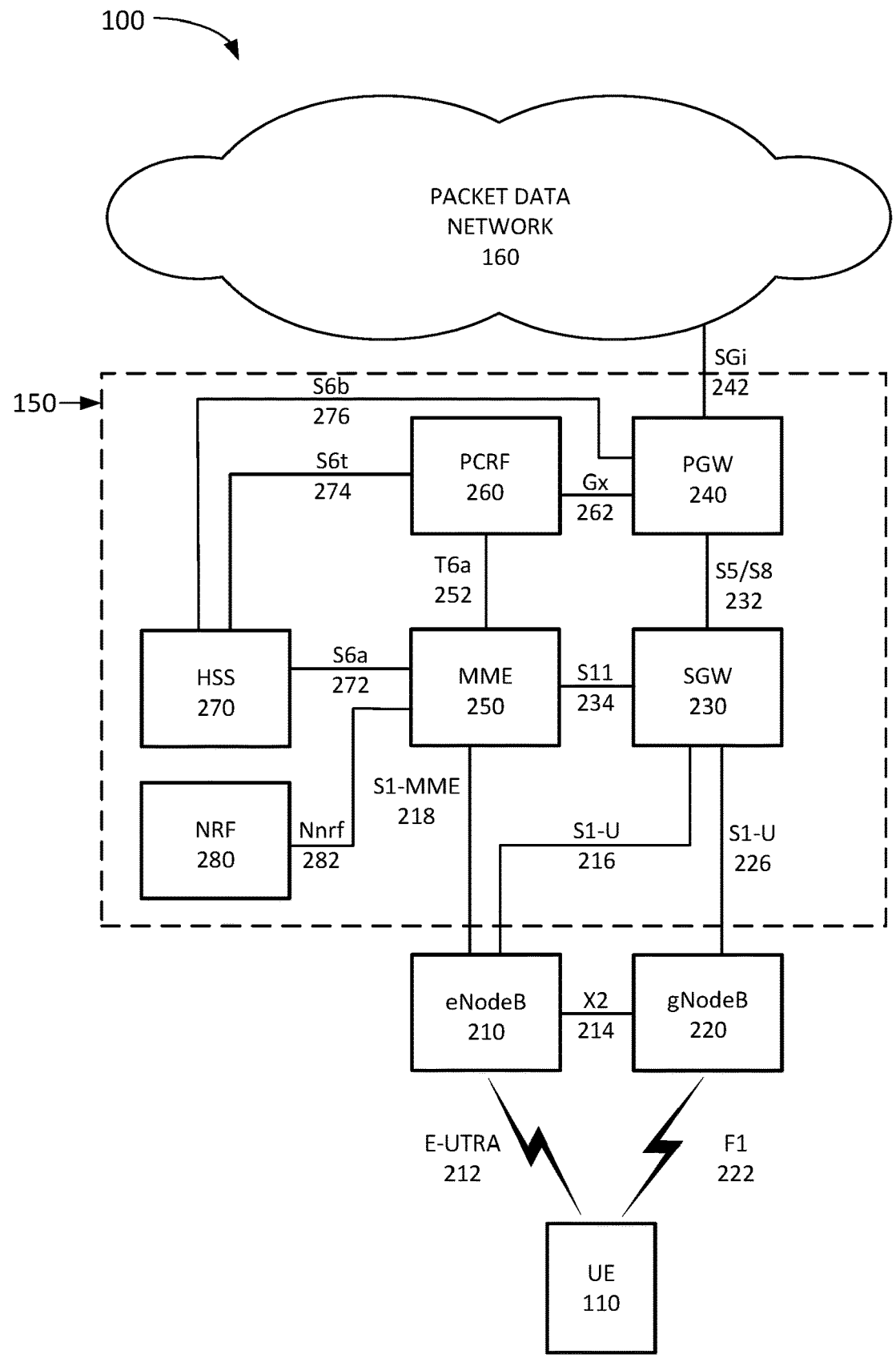
FIG. 2 illustrates exemplary components of the core network of FIG. 1 according to an implementation described herein.

FIG. 2 is a diagram illustrating exemplary components of core network 150 in the context of environment 100 according to an implementation described herein. As shown in FIG. 2, core network 150 may include connections to eNodeB 210, which corresponds to 4G base station 130, and to gNodeB 220, which corresponds to 5G base station 140. Moreover, core network 150 may include a Serving Gateway (SGW) 230, a PGW 240, an MME 250, a Policy and Charging Rules Function (PCRF) device 260, an HSS 270, and an NRF 280. While FIG. 2 depicts a single eNodeB 210, a single gNodeB 220, a single SGW 230, a single PGW 240, a single MME 250, a single PCRF device 260, a single HSS 270, and a single NRF 280, for illustration purposes, in practice, core network 150 may include multiple eNodeBs 210, multiple gNodeB 220, multiple SGW 230, multiple PGW 240, multiple MME 250, multiple PCRF device 260, multiple HSS 270, and/or multiple NRFs 280.

eNodeB 210 may communicate with UE device 110 using a 4G LTE E-UTRA interface 212. eNodeB 210 may interface with core network 150 via an interface referred to as an S1 interface, which may include both a control plane S1-MME interface 218 and a data plane S1-U interface 216. S1-MME interface 218 may be used to interface with MME 250. S1-MME interface 218 may be implemented over, for example, a protocol stack that includes a Non-Access Stratum (NAS) protocol and/or Stream Control Transmission Protocol (SCTP). An S1-U interface 216 may be used to interface with SGW 230 and may be implemented over, for example, using General Packet Radio Service (GPRS) Tunneling Protocol version 2 (GTPv2).

gNodeB 220 may communicate with UE device 110 using a 5G NR air interface referred to as an F1 interface 222. gNodeB 220 may communicate with SGW 230 using an S1-U interface 226. gNodeB 220 may communicate with eNodeB 210 using an X2 interface 214. For example, when gNodeB 220 determines that F1 interface 222 is not available, gNodeB 220 may forward downlink data to UE device 110 via eNodeB 210 using X2 interface 214.

SGW 230 may provide an access point to and from UE device 110, may handle forwarding of data packets for UE device 110, and may act as a local anchor point during handover procedures between eNodeBs 210 and/or gNodeB 220. SGW 230 may interface with PGW 240 through an S5/S8 interface 232. S5/S8 interface 232 may be implemented, for example, using GTPv2. PGW 240 may function as a gateway to packet data network 160 through an SGi interface 242. A particular UE device 110, while connected to a single SGW 230, may be connected to multiple PGWs 240, one for each packet data network 160 with which UE device 110 communicates. For example, a particular PGW 240 may be associated with a particular APN and UE device 110 may connect to the particular APN through the PGW 240 associated with the particular APN. Thus, UE device 110 may be connected to one or more APNs at a particular time.

MME 250 may implement control plane processing for radio access network 120. For example, MME 250 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 250 may also select a particular SGW 230 for a particular UE device 110. A particular MME 250 may interface with other MMES 250 in core network 150 (not shown in FIG. 2) and may send and receive information associated with UE devices 110, which may allow one MME 250 to take over control plane processing of UE devices serviced by another MME 250, if the other MME 250 becomes unavailable. Furthermore, MME 250 may manage non-IP communication with UE 110 using NAS.

MME 250 may communicate with SGW 230 through an S11 interface 234. S11 interface 234 may be implemented, for example, using GTPv2. S11 interface 234 may be used to create and manage a new session for a particular UE device 110. S11 interface 234 may be activated when MME 250 needs to communicate with SGW 230, such as when the particular UE device 110 attaches to radio access network 120, when bearers need to be added or modified for an existing session for the particular UE device 110, when a connection to a new PGW 240 needs to be created, or during a handover procedure (e.g., when the particular UE device 110 needs to switch to a different SGW 230).

PCRF device 260 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF device 260 may communicate with PGW 240 through a Gx interface 262. Gx interface 262 may be implemented, for example, using Diameter protocol.

HSS 270 may store subscription information associated with UE devices 110 and/or information associated with users of UE devices 110. For example, HSS 270 may store subscription profiles that include authentication and access authorization information. Each subscription profile may include information identifying UE device 110, authentication and/or authorization information for UE device 110, services enabled and/or authorized for UE device 110, a subscription type for UE device 110 (e.g., whether UE device 110 is associated with a 5G subscription), device group membership information for UE device 110, and/or other types of information associated with UE device 110. HSS 270 may communicate with MME 250 through an S6a interface 272. S6a interface 272 may be implemented, for example, using a Diameter protocol. HSS 270 may communicate with PCRF device 260 using an S6t interface 274 and with PGW 240 using an S6b interface 276.

NRF 280 may support service registration and discovery of NFs, and maintain profiles of available NF devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. In particular, with respect to PGWs 240 in core network 150, NRF 280 may store information relating to particular PGWs 240, such as whether a particular PGW 240 is a virtual PGW 240 or a non-virtual PGW 240 (i.e., a physical PGW 240 implemented on dedicated hardware). NRF 280 may be accessible via an Nnrf interface 282.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150.

Figure 3:
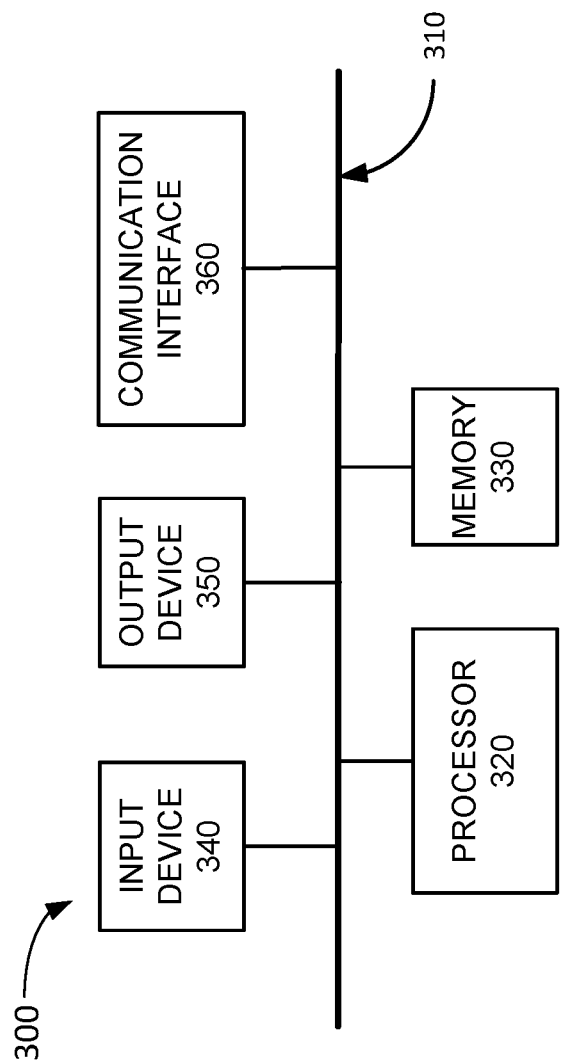
FIG. 3 illustrates exemplary components of a device that may be included in a component of FIG. 1 or FIG. 2 according to an implementation described herein.

FIG. 3 is a diagram illustrating example components of a device 300 according to an implementation described herein. UE device 110, eNodeB 210, gNodeB 220, SGW 230, PGW 240, MME 250, PCRF device 260, HSS 270, and/or NRF 280 may each include, or be implemented on, one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), tensor processing unit (TPU), and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to the selection of PGW 240 for UE device 110. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
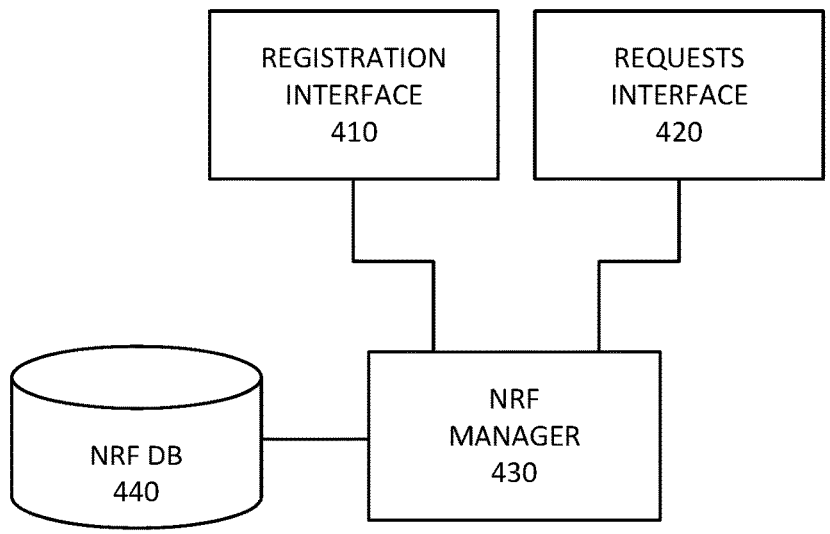
FIG. 4 illustrates exemplary components of the Network Repository Function of FIG. 2 according to an implementation described herein.

FIG. 4 is a diagram illustrating exemplary components of NRF 280. The components of NRF 280 may be implemented, for example, via processor 320 executing instructions from memory 330. Alternatively, some or all of the components of NRF 280 may be implemented via hardwired circuitry. As shown in FIG. 4, NRF 280 may include a registration interface 410, a requests interface 420, an NRF manager 430, and an NRF database (DB) 440.

Registration interface 410 may be configured to receive a registration message from an NF in core network 150 and/or another network (such as a 5G core network). For example, when a new NF is brought online and/or activated, the new NF may register with NRF 280 via registration interface 410. The registration message may include, for example, an NF instance ID associated with an NF instance, information identifying the type of NF associated with the NF instance, a PLMN ID associated with the NF instance, network slices associated with the NF instance, endpoint information for each supported service associated with the NF, location information for the NF, and/or other types of NF information. For example, PGW 240 may register as a particular type of PGW (e.g., a virtual or non-virtual PGW, etc.).

Requests interface 420 may be configured to respond to discovery requests for particular types of NFs. For example, requests interface 420 may receive a request from MME 250 for a list of available PGWs 240 for a particular APN. Requests interface 420 may provide the requested list of available PGWs 240, along with information associated with the PGWs 240 included in the list, to the requesting MME 250.

NRF manager 430 may manage NRF functionality associated with NRF 280, such as registering NF devices, responding to NF requests, and/or receiving and storing information relating to NF devices in core network 150, and/or another network, in NRF DB 440. Exemplary information that may be stored in NRF DB 440 is described below with reference to FIG. 6.

Although FIG. 4 shows exemplary components of NRF 280, in other implementations, NRF 258 may include fewer components, different components, differently arranged components, or additional components than depicted in FIG. 4. Additionally, or alternatively, one or more components of NRF 280 may perform functions described as being performed by one or more other components of NRF 280.

Figure 5:
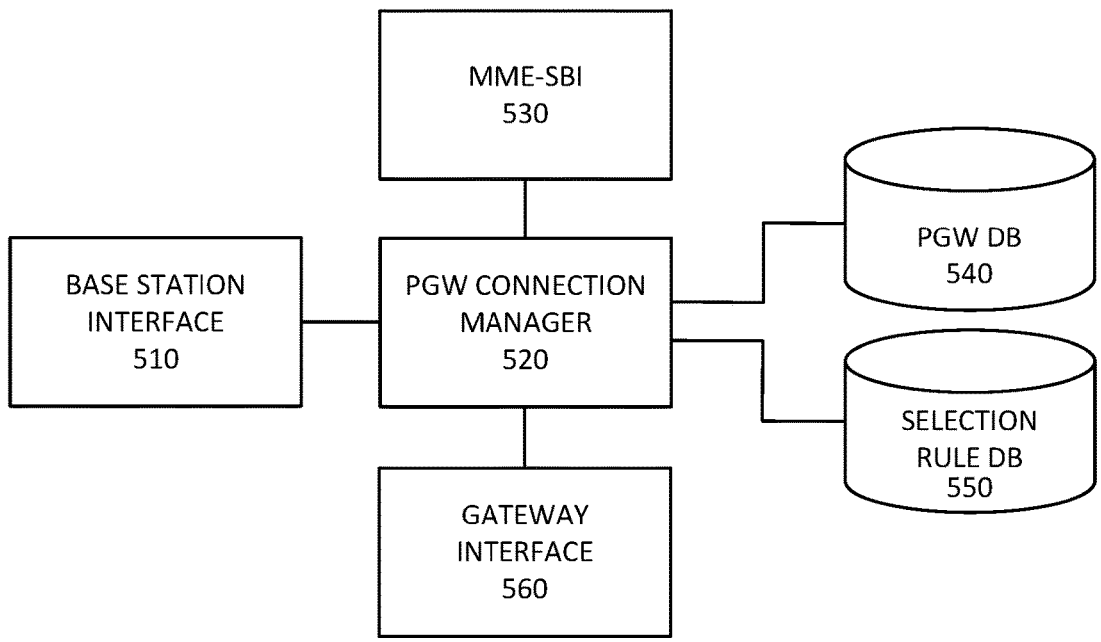
FIG. 5 illustrates exemplary components of the Mobility Management Entity of FIG. 2 according to an implementation described herein.

FIG. 5 is a diagram illustrating exemplary components of MIME 250. The components of MME 250 may be implemented, for example, via processor 320 executing instructions from memory 330. Alternatively, some or all of the components of MME 250 may be implemented via hard-wired circuitry. As shown in FIG. 5, MME 250 may include a base station interface 510, a PGW connection manager 520, an MME SBI 530, a PGW DB 540, a selection rule DB 550, and a gateway interface 560.

Base station interface 510 may be configured to communicate with eNodeB 210 and/or gNodeB 220. For example, base station interface 510 may receive, from eNodeB 210 and/or gNodeB 220, and via S1-MME interface 218, a request on behalf of UE device 110 to set up a connection to a particular packet data network 160. PGW connection manager 520 may be configured to select an SGW 230 and PGW 240 pair for UE device 110 based on an APN requested by UE device 110, based on a location of UE device 110, and/or based on information obtained from NRF 280.

MME SBI 530 may be configured to request a list of available PGWs 240 from NRF 280 using Nnrf interface 282. MME SBI 530 may be required to enable MME 250 to communicate with NRF 280 in order to use Nnrf interface 282, since Nnrf interface 282 is a 5G interface. Thus, MME SBI 530 may translate requests from MME 250 into a format compatible with Nnrf interface 282 and may translate responses received from NRF 280 via Nnrf interface 282 into a format recognized by MME 250. For example, MME SBI 530 may generate a ranked list of available PGWs 240 based on a response received from NRF 280.

PGW DB 540 may store information relating to PGWs 240 obtained from NRF 280. In some implementations, MME 250 may store information relating to PGWs 240 to avoid having to send requests to NRF 280 for each UE device 110 connection requests. In such implementations, MME 250 may obtain an updated list of PGWs 240 from NRF 280 for particular APNs at particular intervals. Selection rule DB 550 may store one or more selection rules used by PGW connection manager 520 to select PGWs 240. For example, a selection rule may prescribe selecting a non-virtual PGW 240 when a UE device 110 requesting a connection is associated with a 5G subscription. Another selection rule may prescribe selecting a PGW 240 based on location. For example, a PGW 240 that is located the closest to a current location of UE device 110 may be selected. As yet another example, a selection rule may prescribe selecting a PGW 240 associated with a highest priority, associated with the most capacity, and/or associated with another attribute or parameter of a particular value.

Gateway interface 560 may be configured to interface with SGW 230. For example, after PGW connection manager 520 selects an SGW 230 and PGW 240 pair, gateway interface 560 may send a create session request to the particular SGW 230 included in the selected SGW 230 and PGW 240 pair.

Although FIG. 5 shows exemplary components of MME 250, in other implementations, MME 250 may include fewer components, different components, differently arranged components, or additional components than depicted in FIG. 5. Additionally, or alternatively, one or more components of MME 250 may perform functions described as being performed by one or more other components of MME 250.

Figure 6:
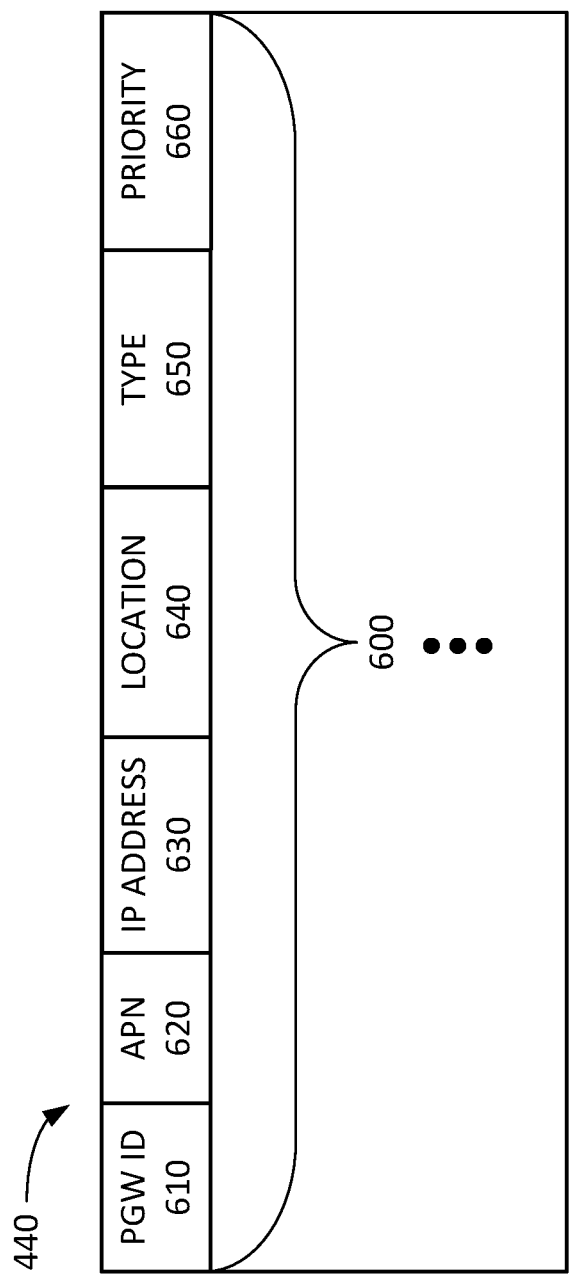
FIG. 6 illustrates exemplary components of the network repository function (NRF) database of FIG. 4 according to an implementation described herein.

FIG. 6 is a diagram illustrating exemplary information stored in NRF DB 440 according to an implementation described herein. As shown in FIG. 6, NRF DB 440 may include one or more PGW records 600. Each PGW record 600 may store information relating to a particular PGW 240. Each PGW record 600 may include a PGW ID field 610, an APN field 620, an IP address field 630, a location field 640, a type field 650, and a priority field 660.

PGW ID field 610 may include an ID that uniquely identifies a particular PGW 240. APN field 620 may include an APN associated with the particular PGW 240. The APN may include a Uniform Resource Identifier (URI) and/or another type of a string of characters. IP address field 630 may include an IP address associated with the particular PGW 240. Location field 640 may identify a geographic location (e.g., GPS coordinates, etc.) for the particular PGW 240.

Type field 650 may include information identifying a gateway type for the particular PGW 240. For example, type field 650 may specify whether the particular PGW 240 is a physical (i.e., non-virtual) PGW 240 or a virtual PGW 240. Priority field 660 may store a priority value associated with the particular PGW 240. As an example, non-virtual PGWs 240 may be assigned a higher priority than virtual PGWs 240. As another example, a first PGW 240 may be assigned a higher priority than a second PGW 240 if the first PGW 240 is associated with a higher capacity and/or a lower load than the second PGW 240.

Although FIG. 6 shows exemplary components of NRF DB 440, in other implementations, NRF DB 440 may include fewer components, different components, additional components, or differently arranged components than depicted in FIG. 6.

Figure 7:
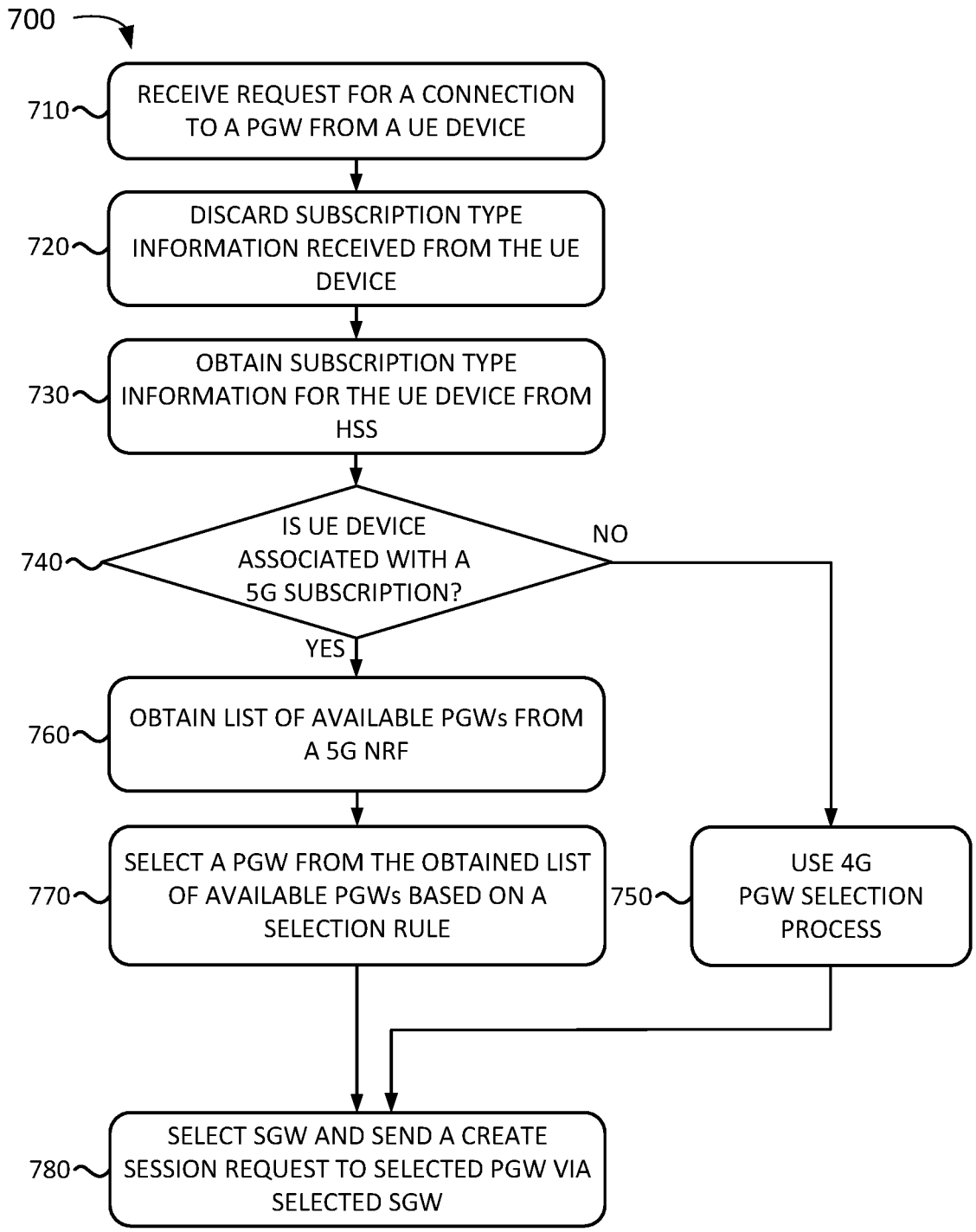
FIG. 7 illustrates a flowchart of a process for selecting a gateway according to an implementation described herein.

FIG. 7 is a flowchart of a process for selecting a PGW according to an implementation described herein. In some implementations, the process of FIG. 7 may be performed by MME 250. In other implementations, some or all of the process of FIG. 7 may be performed by another device or a group of devices separate from MME 250.

The process of FIG. 7 may include receiving a request for a connection to a PGW from a UE device (block 710). For example, UE device 110 may send an attach request to MME 250 via eNodeB 210 and the attach request may specify a particular APN. Subscription type information received from the UE device may be discarded (block 720) and subscription type information for the UE device may be obtained from an HSS (block 730). For example, MME 250 may receive information in the attach request relating to whether UE device 110 is associated with a 5G subscription. However, MME 250 may not consider the information reliable and may discard any subscription type information received from UE device 110. Instead, MME 250 may request and obtain subscription type information from HSS 270.

A determination may be made as to whether UE device 110 is associated with a 5G subscription (block 740). If it is determined that UE device 110 is not associated with a 5G subscription (block 740—NO), a 4G PGW selection process may be used (block 750). An SGW may be selected and a create session request may be sent to the selected PGW via the selected SGW (block 780). For example, MME 250 may send a request to a DNS server for an IP address of a PGW 240 associated with the requested APN. MME 250 may then select a particular SGW 230, to identify an SGW and PGW pair, and send a create session request to the PGW 240 via the selected SGW 230.

If it is determined that the UE device 110 is associated with the 5G subscription (block 740—YES), a list of available PGWs for the APN may be obtained from a 5G NRF (block 760). For example, MME 250 may use MME SBI 530 to send a request, for available PGWs 240 for the requested APN, to NRF 280. NRF 280 may respond by providing the requested list of available PGWs 240. The obtained list may include additional information associated with each listed PGW 240, such as whether a particular PGW 240 corresponds to a virtual or a non-virtual PGW 240, a geographic location for a particular PGW 240, a priority score for a particular PGW 240, etc.

A PGW from the obtained list of available PGWs may be selected based on a selection rule (block 770). An SGW may be selected and a create session request may be sent to the selected PGW via the selected SGW (block 780). For example, MME 250 may select a non-virtual PGW 240 when a UE device 110 requesting a connection is associated with a 5G subscription. As another example, MME 250 may select a PGW 240 based on location. For example, a PGW 240 that is located the closest to a current location of UE device 110 may be selected. As yet another example, MME 250 may select a PGW 240 associated with a highest priority, associated with the most capacity, and/or associated with another attribute or parameter of a particular value. MME 250 may then select a particular SGW 230, to generate an SGW and PGW pair, and send a create session request to the selected PGW 240 via the selected SGW 230.

Figure 8:
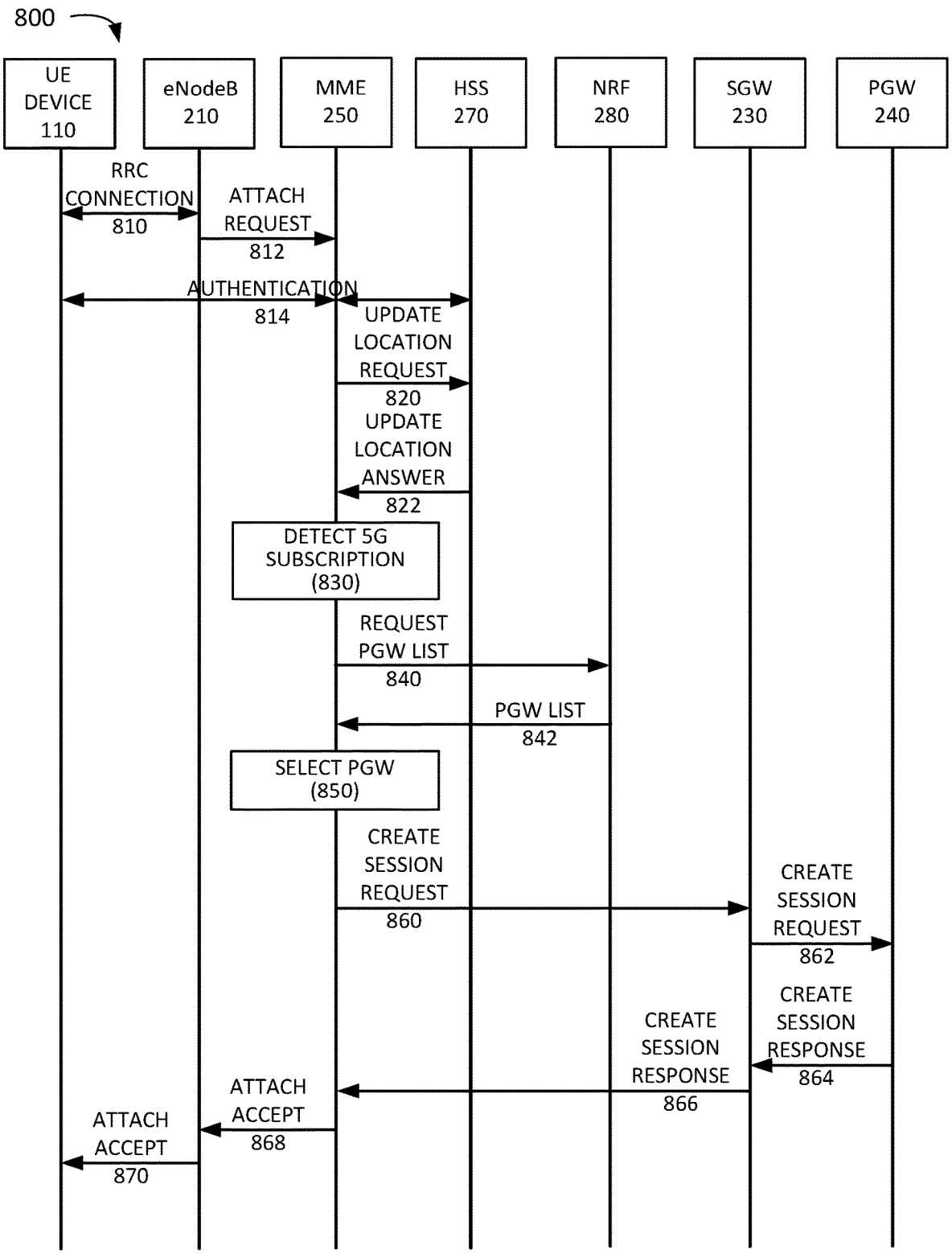
FIG. 8 illustrates an exemplary signal flow according to an implementation described herein.

FIG. 8 is a diagram of an exemplary signal flow 800 according to an implementation described herein. As shown in FIG. 8, signal flow 800 may include UE device 110 establishing a Radio Resource Control (RRC) connection with eNodeB 210 (signal 810) and sending an attach request to MME 250 via eNodeB 210 (signal 812). The attach request may specify an APN to which UE device 110 is requesting to connect. MME 250 may then authenticate UE device 110 with HSS 270 (signal 814). After authentication, MME 250 may send an update location request to HSS 270 (signal 820). The update location request may include a request for subscription type information associated with UE device 110. HSS 270 may respond with an update location answer (signal 822). The update location answer may include subscription type information associated with UE device 110. For example, the subscription type information may indicate that UE device 110 is associated with a 5G subscription.

MME 250 may detect that UE device 110 is associated with a 5G subscription (block 830) and, in response, request a list of available PGWs 240 for the requested APN from NRF 280 using MME SBI 530 (signal 840). NRF 280 may provide the requested list of available PGWs 240 to MME 250 (signal 842). MME 250 may select a non-virtual PGW 240 from the list of available PGWs 240 (block 850). MME 250 may select an SGW 230 and may send a create session request to the selected PGW 240 via the selected SGW 230 (signals 860 and 862). PGW 240 may send a create session response back to MME 250 via SGW 230 (signals 864 and 866) and MME 250 may send an attach accept message to UE 110 via eNodeB 210 (signals 868 and 870). UE device 110 may then be able to communicate with packet data network 160 using PGW 240.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals with respect to FIG. 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a computer device, a request for a connection to a Packet Data Network gateway (PGW) from a User Equipment (UE) device;
obtaining, by the computer device, subscription type information for the UE device;
determining, by the computer device, that the UE device is associated with a next generation subscription based on the obtained subscription type information;
obtaining, by the computer device, a list of available PGWs from a Network Repository Function (NRF), in response to determining that the UE device is associated with the next generation subscription, wherein the NRF provides registration and discovery services for function nodes in a next generation core network;
selecting, by the computer device, a PGW from the obtained list of available PGWs based on a selection rule; and
sending, by the computer device, a create session request for the UE device to the selected PGW.

2. The method of claim 1, wherein obtaining the subscription type information for the UE device includes:
discarding first subscription type information received from the UE device; and
obtaining the subscription type information for the UE device from a Home Subscriber Server.

3. The method of claim 1, wherein selecting the PGW from the obtained list of available PGWs based on the selection rule includes:
selecting a non-virtual PGW from the obtained list of available PGWs.

4. The method of claim 3, wherein selecting a non-virtual PGW from the obtained list of available PGWs includes:
obtaining information, indicating whether a particular PGW in the obtained list of available PGWs corresponds to a non-virtual PGW, from information included in the obtained list of available PGWs.

5. The method of claim 3, wherein selecting a non-virtual PGW from the obtained list of available PGWs includes:
obtaining information, indicating whether a particular PGW in the obtained list of available PGWs corresponds to a non-virtual PGW, from a database of PGWs maintained by the computer device.

6. The method of claim 1, wherein selecting the PGW from the obtained list of available PGWs based on the selection rule includes:
selecting a PGW from the obtained list of available PGW based on a location associated with the UE device.

7. The method of claim 1, wherein obtaining the list of available PGWs from the NRF includes:
using a Mobility Management Entity MME) Service Based Interface (SBI) to send a request for the list of available PGWs to the NRF.

8. The method of claim 7, wherein the MME SBI uses an Nnrf interface to send the request for the list of available PGWs to the NRF.

9. The method of claim 1, further comprising:
receiving another request for a connection to a PGW from another UE device;
obtaining subscription information for the other UE device;
determining that the other UE device is not associated with a next generation subscription; and
using another Generation PGW selection for the other UE device, in response to determining that the other UE device is not associated with the next generation subscription.

10. The method of claim 9, wherein using the other generation PGW selection for the other UE device includes:
sending a request to a Domain Name System (DNS) device for an Internet Protocol (IP) address associated with an Access Point Name (APN) included in the received other request for the connection to the PGW from the other UE device.

11. A device comprising:
a memory storing instructions; and
a processor configured to execute the instructions to:
receive a request for a connection to a Packet Data Network gateway (PGW) from a User Equipment (UE) device;
obtain subscription type information for the UE device;
determine that the UE device is associated with a Fifth Generation (5G) subscription based on the obtained subscription type information;
obtain a list of available PGWs from a 5G Network Repository Function (NRF), in response to determining that the UE device is associated with the 5G subscription, wherein the NRF provides registration and discovery services for function nodes in a next generation core network;
select a PGW from the obtained list of available PGWs based on a selection rule; and
send a create session request for the UE device to the selected PGW.

12. The device of claim 11, wherein, when obtaining the subscription type information for the UE device, the processor is further configured to:
discard first subscription type information received from the UE device; and
obtain the subscription type information for the UE device from a Home Subscriber Server.

13. The device of claim 11, wherein, when selecting the PGW from the obtained list of available PGWs based on the selection rule, the processor is further configured to:
select a non-virtual PGW from the obtained list of available PGWs.

14. The device of claim 13, wherein, when selecting a non-virtual PGW from the obtained list of available PGWs, the processor is further configured to:
obtain information, indicating whether a particular PGW in the obtained list of available PGWs corresponds to a non-virtual PGW, from information included in the obtained list of available PGWs; or
obtain information, indicating whether a particular PGW in the obtained list of available PGWs corresponds to a non-virtual PGW, from a database of PGWs maintained by the computer device.

15. The device of claim 11, wherein, when obtaining the list of available PGWs from the 5G NRF, the processor is further configured to:
use a Mobility Management Entity MME) Service Based Interface (SBI) to send a request for the list of available PGWs to the 5G NRF.

16. The device of claim 15, wherein the MME SBI uses an Nnrf interface to send the request for the list of available PGWs to the 5G NRF.

17. The device of claim 11, wherein the processor is further configured to:
receive another request for a connection to a PGW from another UE device;

obtain subscription information for the other UE device;
determine that the other UE device is not associated with a 5G subscription; and
send a request to a Domain Name System (DNS) device for an Internet Protocol (IP) address associated with an Access Point Name (APN) included in the received other request for the connection to the PGW from the other UE device, in response to determining that the other UE device is not associated with the 5G subscription.

18. A system comprising:
a Fifth Generation (5G) Network Repository Function (NRF) device configured to:
maintain a repository of network functions in a 5G network, wherein the repository of network function devices includes a list of available Packet Data Network gateways (PGWs); and
a Mobility Management Entity device configured to:
receive a request for a connection to a PGW from a User Equipment (UE) device;
obtain subscription type information for the UE device;
determine that the UE device is associated with a Fifth Generation (5G) subscription based on the obtained subscription type information;
obtain a list of available PGWs from the 5G NRF, in response to determining that the UE device is associated with the 5G subscription, wherein the NRF provides registration and discovery services for function nodes in a next generation core network;
select a PGW from the obtained list of available PGWs based on a selection rule; and
send a create session request for the UE device to the selected PGW.

19. The system of claim 18, wherein the 5G NRF device is further configure to:
store, for a particular PGW in the list of available PGWs, an indication of whether the particular PGW corresponds to a virtual PGW or a physical PGW.

20. The system of claim 18, wherein the 5G NRF device is further configure to:
store, for particular PGWs in the list of available PGWs, priority scores, wherein a first priority score for a first PGW is higher than a second priority score for a second PGW, when the first PGW corresponds to a physical PGW and the second PGW corresponds to a virtual PGW.

* * * * *